United States Patent [19]

Alderson

[11] Patent Number: 5,347,649
[45] Date of Patent: Sep. 13, 1994

[54] SYSTEM FOR DYNAMICALLY GENERATING, CORRELATING AND READING MULTIPROCESSING TRACE DATA IN A SHARED MEMORY

[75] Inventor: Graham R. Alderson, Eastleigh, England

[73] Assignee: International Business Machines Corp., Armonk, N.Y.

[21] Appl. No.: 489,397

[22] Filed: Mar. 6, 1990

[30] Foreign Application Priority Data

May 12, 1989 [GB] United Kingdom ............ 89304815.7

[51] Int. Cl.$^5$ ...................... G06F 11/30; G06F 11/32
[52] U.S. Cl. .................................... 395/600; 395/425; 395/500; 395/575; 364/DIG. 1; 364/267; 364/267.2; 364/267.4; 364/281.7; 364/285.1; 371/19
[58] Field of Search ................ 364/300, 490; 395/161, 395/575, 400, 600, 425, 500; 371/19

[56] References Cited

U.S. PATENT DOCUMENTS

| | | | |
|---|---|---|---|
| 4,462,077 | 7/1984 | York ................................... | 364/300 |
| 4,598,364 | 7/1986 | Gum et al. ........................... | 364/300 |
| 4,764,863 | 8/1988 | Silverthorn, III et al. ......... | 395/575 |
| 4,845,615 | 7/1989 | Blasciak .............................. | 395/400 |
| 5,103,394 | 4/1992 | Blasciak .............................. | 395/575 |
| 5,168,554 | 12/1992 | Luke ................................... | 395/161 |

FOREIGN PATENT DOCUMENTS

0130467A2 6/1984 European Pat. Off. ..... G06F 11/00

OTHER PUBLICATIONS

IBM S/370 Principles of Operation, Form No. GA2-2-7000-8, pp. 4-11 through 4-15.
Structural Computer Organization, Tannenbaum, A. S., Prentice-Hall, Inc. pp. 218-236.
A Debugger for Concurrent Programs, J. Gait, Software-Practice and Expenence vol. 15 (6), 539-554 (Jun., 1985).

Primary Examiner—Thomas C. Lee
Assistant Examiner—Wayne Amsbury
Attorney, Agent, or Firm—Robert S. Babayi

[57] ABSTRACT

A data processing system adapted to perform a plurality of interleaved data processing functions (2, 4, 6), characterised in that each data processing function (2, 4, 6) stores self-diagnostic trace data in a memory (16) shared between the data processing functions (2,4,6) and the data processing system performs a trace function (8) which reads the trace data from the shared memory (16) and correlates the trace data into a single output. The disclosed system provides a trace facility in which a single correlated trace output is produced from the trace messages produced by all the different data processing functions (2, 4, 6). A single correlated output enables errors involving the interaction of two or more data processing functions (2, 4, 6) to be more easily identified.

11 Claims, 1 Drawing Sheet

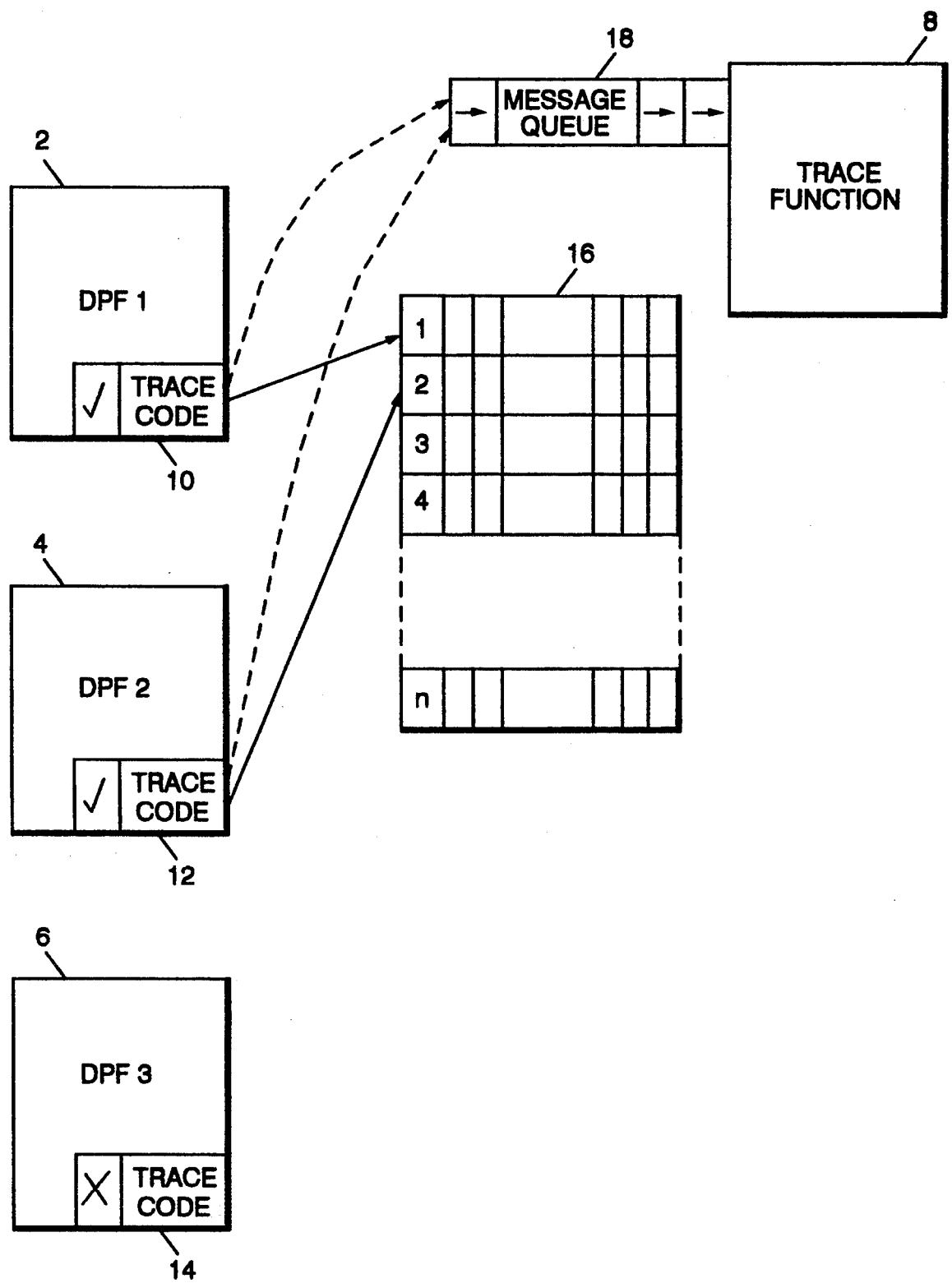

SYSTEM FOR DYNAMICALLY GENERATING, CORRELATING AND READING MULTIPROCESSING TRACE DATA IN A SHARED MEMORY

The present invention relates to data processing systems. More particularly the present invention relates to the analysis and debugging of data processing systems adapted to perform a plurality of interleaved data processing functions.

When debugging data processing programs it is often desirable that the programmer should be able to closely follow and analyse the state of the system at and around the point in the program at which the fault occurs. It is known to provide data processing systems with a so called 'trace' function which when activated will typically either display or write to file a sequence of messages indicative of the state of the system at various times as the program under analysis proceeds.

It is also known to provide data processing systems in which a plurality of interleaved data processing functions, threads or tasks are performed at any one time. Such systems could for example provide the functions of providing a user with word processing facilities as well as the processing of the monthly payroll. In such a case the system could immediately undertake the processing required for the word processing facility as the need arose and in the times in between proceed with the background task of processing the payroll data. The provision of a trace function is more complex in such multiprocessing/multitasking systems since the program for each function is not processed uninterrupted.

An example of a trace function in a multiprocessing system is described in U.S. Pat. No. 4,462,077. The system described in U.S. Pat. No. 4,462,077 has a trace facility whereby each data processing function has its own trace code and is separately traced, the diagnostic information for each process being stored in its own trace data file. U.S. Pat. No. 4462077 is concerned with providing a system in which how, or whether or not, a particular function is being traced can be changed without suspending the operation of any function.

It is the purpose of tracing functions that they should provide as much useful information as possible to whoever is trying to debug the program so as to enable the problem concerned to be easily and quickly identified.

Viewed from one aspect the present invention provides a data processing system adapted to perform a plurality of interleaved data processing functions, characterised in that each said data processing function stores self-diagnostic trace data in a memory shared between said data processing functions, and said data processing system performs a trace function which reads said trace data from said shared memory and correlates said trace data into a single output.

The present invention recognises that in the operation of a multi-processing system a problem in one data processing function may arise because of some state or occurrence in a different data processing function. In order to diagnose such a problem it is necessary to be able to simultaneously trace the two functions concerned and time correlate the trace data produced to allow a direct study of the interaction of the processes.

The shared memory can have a number of possible forms such as a section of RAM, a disk file, a message queue, a pipeline etc. The shared memory can be any resource that can be shared between functions the important point being that all the functions including the trace function can access it to read and write information as necessary.

It will be appreciated that the data processing system will normally have an operating system which controls the division of processing time between the different functions; the data processing and trace functions effectively residing above the operating system in the programming structure. Other configurations are however possible, e.g. the trace function could form part of the operating system whilst the data processing functions remain above the operating system.

The correlation carried out might be to order the trace data according to the time at which the data processing system carried out the step generating that piece of trace data. However, the trace data may be correlated in other ways such as in input or output order etc. The present invention provides a trace function for correlating the trace data from different data processing functions. This is made possible by the shared memory using which the different data processing functions pass trace data to the trace function.

In the case of time correlation, a problem may arise due to more than one data processing function trying to read from or write to a disk file at any one time. Tracing just a single data processing function would not show that the problem was in fact being caused by an overlapping read/write process occurring in another function. In such circumstances, the present invention (with time ordering correlation) would make the identification of the problem much easier.

Another advantage of the present invention over the prior art is that less code need be added to each function in order that that function may be traced, since the code for functions such as displaying the trace data or writing it to file may be centralised within the trace function. In addition if it is desired to make a change in the code for displaying the trace data then this change need only be made once in the code for the trace function. A further advantage of this arrangement is that a common programming interface may be defined for allowing a data processing function to interact with the trace function. This makes it easier for the author of the code of a new data processing function to ensure that it offers a trace facility. Furthermore, the trace function need not be permanently stored with the memory of the system thereby reducing the loss of available memory associated with the the prior art systems in which a large amount of trace code is permanently attached to each data processing function. In the case of the present invention the code for the trace function need only be loaded when needed.

In preferred embodiments of the present invention the shared memory comprises a plurality of memory blocks, each memory block providing storage for trace data from one data processing function. This feature has the advantage that the data processing function has a specific location in which it can write its trace data for subsequent reading by the trace function and the trace function knowns where to find trace data for that function when it wishes to process it.

In particularly preferred embodiments of the present invention when a data processing function starts to pass trace data to said trace function, the memory blocks are tested to find a memory block which is not currently being used, that memory block then being assigned for use by the data processing function starting to pass trace data. This feature has the advantage that since memory blocks are not permanently assigned to particular data processing functions it is easy to add a new data processing function to the system since the new data processing function will be assigned a memory block when necessary just as the existing data processing functions are.

A particularly preferred embodiment of this feature is a data processing system having an operating system providing a semaphore function, whereby said operating system may allocate a given semaphore to only one data processing function and wherein a memory block is associated with each semaphore, a data processing function being assigned a memory block by having the corresponding semaphore assigned to said data processing function. Existing operating systems for interleaved data processing functions already provide the semaphore feature and its use ensures that a data processing function part of the way through having a memory block assigned to it does not find that the operating system passes control to another data processing function which then attempts to claim the same memory block. Since the semaphore is a feature of the operating system itself it is not subject to the possible problem of being claimed by more than one function.

Another preferred feature of the present invention is that the trace data includes an indentification of which data processing function is providing the trace data. This feature enables the trace function to identify which data processing function is communicating with it through which memory block thereby overcoming any confusion arising from the fact that any data processing function may have been allocated any memory block. Also, a newly installed data processing function is able to identify itself to the trace function using this feature without it being necessary to alter the code for the trace function.

The trace function is in preferred embodiments adapted to display the trace data from each different data processing function in a different colour thereby aiding the user of the trace function in the interpretation of the trace data provided. Alternatively or in addition preferred embodiments of the invention add a prefix to each trace message to identify the data processing function which produced that message.

Preferred embodiments of the present invention also include the feature that said trace function stores control information in said shared memory and said data processing functions alter their output of trace data in response to said control data. This feature provides the user of the trace function with a degree of control over the trace data by providing communication with the trace code within the data processing function via the shared memory.

A data processing function may sometimes need to send more data to the trace function than can be stored by the shared memory. In such circumstances said data processing functions store said trace data in a buffer memory and store information in said shared memory to enable said trace function to read said trace data from said buffer memory.

As in the case of the shared memory the buffer memory can take a number of different forms, the important point being that the data processing functions can store their trace data there and the trace function is able to read that stored trace data.

Viewed from another aspect the present invention provides a method of providing diagnostic trace data for a data processing system performing a plurality of interleaved data processing functions characterised in that each said data processing functions stores self-diagnostic trace data in a memory shared between said data processing functions and a trace function reads said trace data from said shared memory and correlates said trace data into a single output.

An embodiment of the invention will now be described, by way of example only, with reference to the accompanying drawing in which:

FIG. 1 schematically illustrates the structure of the code of an embodiment of the invention.

The invention may be embodied as a standalone trace function and a small amount of code added to the data processing function to be traced to send trace requests to the trace function. The trace function uses the facility provided by most multitasking operating systems of a software flag (typically called a 'semaphore') which may be claimed by only one function at any one time; and for a buffer area that may be shared across multiple functions ('shared memory').

When the trace function is started it creates a number of semaphores and a shared memory buffer. The number of semaphores created is equal or greater than the number of data processing functions that are required to be traced. The shared memory buffer is used to pass details of a trace request to the trace function such as the text of the message and display options such as whether it should be highlighted in the trace output display. These details are grouped together into a structure (memory block), and the shared memory buffer should be sufficiently large to contain a separate copy of this structure for each function to be traced.

The trace function then waits for a trace request from another data processing function which is made by setting a flag in one of the shared memory structures, or alternatively by sending a message to the trace function if the operating system provides this facility.

A data processing function wishing to use the trace function first tries to access the shared memory buffer. If this access fails, then the trace function is not running and a flag may be set to disable further tracing calls to reduce any performance degradation in the data processing function. If the shared memory is accessed, then the data processing function attempts to claim each semaphore in turn until successful. The number of the semaphore claimed uniquely identifies the data processing function to the trace function, and identifies the structure (memory block) to be used by this data processing function within the shared memory buffer. A trace message is then sent to the trace function containing the name of the process and its number, so that the user can identify it.

To send a trace message to the trace function, the data processing function copies the trace message and any display options into the appropriate structure in the shared memory structure, and also sets a flag in this structure to indicate to the trace program that a trace message is waiting to be displayed. Alternatively, a message could be sent to the trace function directly to indicate this. When the trace function has displayed the trace message it clears the flag, to indicate that the data processing function being traced may continue. If flags are used to request the trace function to display trace messages, then it is preferred to place the time of each trace message in the shared memory structure to ensure the trace function displays each trace message in correct time order. If a message mechanism with a message queue is available from the operating system then this may be used to send messages to the trace function direct indicating a particular structure is holding a trace message, the order being automatically preserved in the queue.

The data processing function being traced may sometimes request the contents of a buffer be displayed by the trace function, by temporarily allocating a shared memory buffer large enough for the data, copying the data into it and putting the address and length of the data into the trace function shared memory buffer. Either different software flags or a different message is used to indicate the different request type to the trace program. Once the trace function indicates the display of this data is completed by clearing the software flag the temporary shared memory buffer can be freed.

By acting on the display request messages of flags as they are received from the various data processing functions, the trace function creates a single correlated output of all the trace output in correct time order. When each message is displayed, it is prefixed by the number for that data processing function so that the user can identify the source of the message. The messages from each different data processing function are displayed in different colours. Controls within the trace function are used to indicate the output for the trace information, whether it is to be displayed on the screen, and/or written to file or other device.

When a data processing function has completed, or no longer wishes to trace, it sends a trace message to this effect to make it clear to the user that tracing for this data processing function on this is has completed. It then frees the semaphore it claimed earlier for other data processing functions to use.

The trace facility assigns one of a range of different numbers of 'trace points' to the trace messages, to indicate from which part of the data processing function being traced the message came from. The trace point number is displayed in the prefix to each message. Controls in the trace function allow the user to select which trace points should be traced for each data processing function thus allowing much more selective tracing to be made. This control data is passed to the data processing functions via the shared memory. By having the control mechanism and selection for this facility within the trace function the trace code required in the data processing function being traced is minimised. In addition, the choice of trace points to be traced may be changed by the user at any time for the data processing function. The initial selection of trace points may be made by the data processing function to be traced, or by the trace function obtaining the users selection.

Further features provided are the regular timestamping of the trace output, and the allowing of the user to request that only highlighted messages should be displayed. In addition the trace function displays the trace messages from each different data processing function in a different colour and prefixes each trace message with the number of the semaphore which that data processing function claimed and the name of the data processing function.

FIG. 1 is a schematic diagram illustrating the structure of code for the above described embodiment. The system contains a number of interleaved data processing functions (DPFs) (2,4,6). Two of these DPFs, namely DPF1 and DPF2 are activated by the trace function (8) to supply trace messages. DPF3 is not required to be traced and supplies no trace messages.

As each DPF being traced (2,4) reaches a point in its processing at which a trace message is required it passes control to the small amount of trace code (10,12) attached to it. The DPF will have already claimed one of the structures/memory blocks 1, 2, 3, 4 ... 22 within the shared memory (16) when that DPF was first activated. In the case of DPF1, the trace code (10) sends the trace message into structure/memory block 1. The trace code (10) also sends a message to the memory queue (18) of the trace function (8) indicating a message is waiting in structure/memory block 1. A flag is set in the structure memory block 1 indicating processing in DPF1 should be suspended.

Processing then passes to other functions within the system such as DPF2 and DPF3 which themselves may send further messages to the shared memory (16) and memory queue (18).

When control is passed to the trace function (8) it reads the message queue (18) and one by one proceeds to read and process the trace messages waiting in the shared memory (16). As each message is processed it may be displayed and/or written to file. When processing of a message is complete the trace function (8) resets the flag in structure/memory block 1 to indicate that the DPF may now resume processing. When the trace function (8) has processed all the messages waiting for it (as indicated by the message queue (18)) it transfers control back to the DPFs.

I claim:

1. A diagnostic tracing system for a multitasking data processing system adapted to perform a plurality of interleaved data processing task functions comprising
   a plurality of means for performing said data processing task functions,
   a shared memory shared between said plurality of means for performing said data processing task functions,
      each said means for performing said data processing task functions including selectively operative means for storing self-diagnostic trace data in said shared memory, and access means for attempting access to said shared memory and if access fails, setting a flag to disable tracing calls from said data processing task function.
   trace data processing means co-operative with any or all of said means for performing said data processing task functions; said trace data processing means processing trace data stored in said shared memory by said means for performing said data processing task functions; said trace data processing means including:
      trace data reading means operating in real time overlap with said means for performing said data processing task functions, for reading said trace data from said shared memory, and
      means co-operative with said trace data reading means for correlating said trace data read from said shared memory into a single output, said single output showing a sequential interaction of said plurality of means for performing said data processing task functions wherein each said means for performing said data processing task functions including trace message means for placing a trace message in said shared memory and indicating to said trace data processing means that a message is waiting to be displayed.

2. A data processing system as claimed in claim 1, wherein said shared memory comprises a plurality of memory blocks, each memory block providing storage for trace data from one data processing function.

3. A data processing system as claimed in claim 2, wherein when a data processing function starts to pass trace data to said trace function, said memory blocks are tested to find a memory block which is not currently being used, that memory block then being assigned for use by said data processing function starting to pass trace data.

4. A data processing system as claimed in claim 3, having an operating system providing a semaphore function, whereby said operating system may allocate a given semaphore to only one data processing function and wherein a memory block is associated with each semaphore, a data processing function being assigned a memory block by having the corresponding semaphore assigned to said data processing function.

5. A data processing system as claimed in claim 1 wherein said trace data includes an identification of which data processing function is providing said trace data.

6. A data processing system as claimed in claim 1 wherein said trace function stores control information in said shared memory and said data processing functions alter their output of trace data in response to said control data.

7. A data processing system as claimed in claim 1 wherein said data processing functions store said trace data in a buffer memory and store information in said shared memory to enable said trace function to read said trace data from said buffer memory.

8. A data processing system as claimed in claim 1 wherein said trace data from each different data processing function is displayed in a different color.

9. A data processing system as claimed in claim 1 wherein said trace data from each different data processing function is displayed prefixed by an indication of the data processing function from which said trace data originates.

10. A method of providing diagnostic trace data for a data processing system comprising
performing a plurality of interleaved data processing task functions,
relative to any of said data processing task functions, selectively storing self-diagnostic trace data in a memory shared between all of said data processing task functions,
relative to said trace data stored by any of said task functions, reading respective said trace data from said shared memory without interrupting or suspending performance of task functions unassociated with said respective trace data, and
relative to said respective trace data read from said shared memory, and without interrupting or suspending performance of any unassociated said task function, correlating said trace data into a single output, said single output showing a sequential interaction of said plurality of interleaved data processing functions, and
relative to any of said data processing task functions, attempting to access said shared memory and if access fails setting a flag to disable tracing calls from said any tasks, and
relative to any of said data processing task functions, sending a trace message to said shared memory and indicating to the trace function that a message is waiting to be displayed.

11. A data processing system comprising
a plurality of interleaved data processing task function modules,
each said data processing task function module being configured to selectively generate self-diagnostic trace data,
a memory shared between said data processing task function modules,
said task function modules including means for storing said selectively generated trace data in portions of said shared memory selectively allocated to respective task function modules, and
a trace function module separate from said task function modules,
said trace function module including means for reading said trace data from said memory, without interrupting performance of any task function unassociated with the data that is being read, and means for combining all of the trace data read from said memory into a single correlated output function, said output function showing a sequential relation between trace data generated sequentially by said plurality of interleaved data processing task function modules, and
said task function modules including means for attempting to access said shared memory and if access fails setting a flag to disable tracing calls from said any task, and
said tasks function modules including means for sending a trace message to said shared memory and indicating to the trace function that a message is waiting to be displayed.

* * * * *